United States Patent [19]

Amberkar

[11] 4,456,632

[45] Jun. 26, 1984

[54] WHITE ELECTROSENSITIVE PAPER

[75] Inventor: Suresh D. Amberkar, Maharashtra, India

[73] Assignee: Dennison Manufacturing Company, Framingham, Mass.

[21] Appl. No.: 450,164

[22] Filed: Dec. 16, 1982

Related U.S. Application Data

[63] Continuation-in-part of Ser. No. 200,662, Oct. 27, 1980, abandoned.

[51] Int. Cl.[3] .......................... B32B 31/00; B32B 3/00

[52] U.S. Cl. .................................... 427/124; 427/121; 427/250; 427/348; 427/374.1; 427/374.3; 427/377; 427/379; 427/382; 427/391; 427/394; 427/395; 427/398.5; 427/407.1; 427/411

[58] Field of Search ............... 427/121, 123, 124, 335, 427/348, 374.3, 377, 379, 382, 389.9, 391, 394, 395, 398.5, 58, 250, 374.1, 404, 407.1, 411

[56] References Cited

U.S. PATENT DOCUMENTS

| | | | |
|---|---|---|---|
| 3,265,524 | 8/1966 | Echeagaray . | |
| 3,511,700 | 5/1970 | Miro | 428/206 |
| 3,786,518 | 1/1974 | Atherton | 428/342 |

FOREIGN PATENT DOCUMENTS

| | | | |
|---|---|---|---|
| 165390 | 5/1954 | Australia | 427/121 |
| 5017263 | 6/1975 | Japan | 427/121 |

OTHER PUBLICATIONS

Marsden et al., *Solvents Guide*, Cleaver-Hume Press Ltd., London, 1963, pp. 551-552.

*Primary Examiner*—Michael R. Lusignan
*Assistant Examiner*—Richard Bueker
*Attorney, Agent, or Firm*—Arthur B. Moore

[57] ABSTRACT

Method and apparatus for fabricating electrosensitive paper with a white finish. The paper comprises a base layer of paper, a solvent-based resin coating, and a thin surface layer of aluminum, optionally including a white overcoat. A mixture of solvents may be employed having different evaporation rates, providing a white appearance of the metallized layer. The solvent mixture may include a relatively volatile true solvent, and a less volatile diluent. After application of the resin coating in solution to the paper base, the solvents may be evaporated using a three-stage drying process in which the first stage involves an elevated temperature with turbulent air flow.

10 Claims, 2 Drawing Figures

10

WHITE ELECTROSENSITIVE PAPER

BACKGROUND OF THE INVENTION

The present application is a continuation-in-part of U.S. application Ser. No. 200,662, filed Oct. 27, 1980, now abandoned.

The present invention relates to electrosensitive papers, and more particularly to electrosensitive papers having a white or matte appearance.

Electrosensitive substrates typically comprise a support layer or layers, over which is coated a thin layer of vapor-deposited metal, such as aluminum. Electrosensitive substrates receive impressions using a stylus which is applied to the metallic surface or disposed at a short distance therefrom. When the stylus is subjected to an electrical potential with respect to a grounding member in contact with a nearby part of the metallic surface, a current path is formed causing a melting or vaporization of the metallic surface in a pattern corresponding to the shape and path of the stylus. The metallic surface layer is sufficiently thin that the metal may be vaporized without an excessive voltage requirement. The metallic surface, on the other hand, is thick enough to effectively mask the underlying support in those areas which have not been vaporized by the stylus, and to provide a proper current path for printing.

In electrosensitive papers, the support includes a base layer of paper, and typically also includes a thin resin layer between the paper and the metallic surface in order to avoid penetration of the paper base with the vaporized metal, and to protect the base paper during printing. The resin layer is usually colored with a pigment or dye to provide a contrasting underlayer which yields a distinct image where the metallic surface layer has been removed.

It is known in the prior art to modify the chemical composition of the resin layer in order to achieve a matte finish. This is illustrated in U.S. Pat. No. 3,786,518, which discloses the addition to the resin layer of a matting agent, consisting of a finely divided inert solid such as silica. U.S. Pat. No. 3,861,952 discloses the addition of one or more nonconductive pigments to the resin layer in order to adjust the roughness of the vapor deposited aluminum layer.

It is also known to modify the process of manufacture in order to create a matte surface. U.S. Pat. No. 3,861,952, cited above, discloses methods of fabricating electrosensitive paper in which the glossiness of the aluminum surface layer is less than 20 percent. This may be done, for example, by sandblasting the surface of a polyethylene film before vapor depositing a metallic surface, or by dissolving a layer of cellulose acetate in acetone, and drying this material in a high humidity atmosphere. These techniques, however, are suitable only for a limited range of materials, and while they more closely approximate the appearance of bond paper, they do not yield a truly white electrosensitive surface.

Accordingly, it is a principal object of the invention to provide a method of fabricating electrosensitive substrates having a white or matte appearance. A related object is the achievement of a surface texture in metallized paper which approximates bond paper.

Another object of the invention is to provide manufacturing techniques for electrosensitive paper which may be adapted to a wide range of materials.

SUMMARY OF THE INVENTION

In furthering the above and related objects, the invention provides improved compositions and manufacture techniques for electrosensitive paper. The electrosensitive paper of the invention includes a paper substrate, an intermediate contrast layer, and a metallic layer; optionally, the paper further includes a white surface coating. The intermediate contrast layer typically includes a film-forming resin mixed with a coloring material (such as a pigment or dye). The paper is characterized by reduced gloss, and a white appearance which may approach that of bond paper. The various techniques can be used to achieve a Whiteness Index of better than 83, and preferably higher than 86, as measured under Standard E313-73 of the American Society for Testing and Materials.

In accordance with one aspect of the invention, the colored resin layer may be modified to reduce the glossy, metallic appearance of the finished paper. This may be done, for example, by adding a matting agent to this layer. In the preferred embodiment of the invention, this layer is coated onto the paper base using a non-aqueous solvent. The process by which the solvent is evaporated may be controlled to create a rough appearance of the dried intermediate layer. This texture reduces the glossiness of the paper after it is metallized, creating a white appearance.

A preferred fabrication technique according to the invention uses a "diluent blush" effect in coating and drying the intermediate resin layer. The coating formulation incorporates a mixture of one or more relatively volatile solvents and one or more relatively nonvolatile solvents. In the preferred version of this technique, the relatively nonvolatile solvents are not true solvents for the resin formulation, but rather are diluents, characterized by poor solvency properties.

In a particular embodiment of the invention the intermediate contrast layer is dried using a novel three-stage drying profile. The first zone exposes the coating to extremely high temperatures, using turbulent air flow. In the second zone the temperature drops to a low value, while the third zone has an intermediate temperature. Illustrative temperatures are 350° F. in the first zone, 200° F. for the second stage, and 300° F. for the third stage.

In accordance with a particular embodiment of the invention, a white surface layer is coated over the metallic layer to enhance the whiteness of the metallized paper. As a related aspect, the materials for this layer are chosen to create an opaque appearance, while providing minimal interference with current flow in the metallic layer.

BRIEF DESCRIPTION OF THE DRAWINGS

The above and additional aspects of the invention are illustrated with reference to the detailed description which follows, taken in conjunction with the drawings in which.

DETAILED DESCRIPTION

Figure 1:
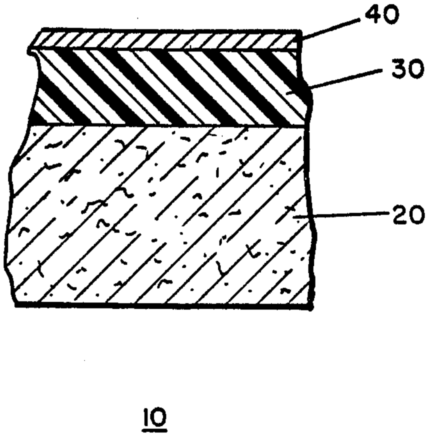
FIG. 1 is a sectional schematic view of electrosensitive paper in accordance with a preferred embodiment of the invention.

White electrosensitive metallized paper according to a preferred embodiment of the invention utilizes a three layer construction, as illustrated in sectional schematic view of FIG. 1. Electrosensitive paper 10 includes a paper base 20, an intermediate resin layer 30, and a vacuum deposited metallic layer 40.

In the preferred, solvent-based coating technique of the invention, it is necessary that the base paper have physical characteristics which will allow it to pass through the coating operation satisfactorily. For most applications, it is desirable that the paper 20 have a caliper in the range from about 2.0 mil to 3.0 mil. For applications requiring a thicker stock, such as ticket stock, a thickness of up to about 8 mil may be advantageous. The paper advantageously has a good moisture balance, to provide dimensional stability under varying humidity conditions, with a low tendency to curl.

The intermediate layer 30 provides a buffer between the paper base 20 and the metallized layer 40, so that the vaporization of portions of the metal layer during imprinting will not cause an objectionable odor and will achieve a pleasing appearance. It is desirable that this layer be colored to provide a clear contrast between the metallized surface and the exposed subsurface. Black pigmentation creates an especially effective contrast to the white surface which is characteristic of the invention. A number of pigments have proven suitable for this purpose, but the preferred material is carbon black.

In order to reduce the glossiness of the metallized surface, it is advantageous to include a matting agent as a filler in the intermediate layer 30. Suitable materials include clay and silica. A mean particle size in the range from about 2 to 4 microns is preferred. The matting agent provides a rough, grainy surface over which the metallic layer 40 is deposited. The matting agent advantageously constitutes between 0.5 and 10 percent of the coating 30 (including solvent), with a preferred range from about 1.0 to 4 percent.

The intermediate layer 30 additionally includes a film-forming resin which acts as a binder for the pigment and matting agent. The resin should have high tensile strength and elasticity, low moisture absorption, and compatibility with the other components of the coating. The resin should be chosen to provide a colored layer 30 of relatively high resistance. Furthermore, the resin should be compatible with the vacuum deposition of an aluminum overcoat 40 or similar materials. The binder to pigment ratio may be in the range from about 1 to 1 to about 4 to 1, with the preferred value being approximately 2 to 1. An excessive amount of pigment will result in some of the pigment being free floating, while insufficient pigment will result in a gray color which will not provide adequate contrast with the metallized surface.

Prior to application of the materials in intermediate layer 30 to paper base 20, these materials are thoroughly mixed, and then dissolved in a solvent mixture. The mixing stage provides a good dispersion of the pigment and filler components in the resin; the mixture optionally includes additional components such as plasticizers and dispersants. Any apparatus which is well known in the art for mixing coatings may be employed for this purpose, such as ball mill or sand mill apparatus. It is preferred to thoroughly mix the nonsolvent components prior to addition of the solvents. In general a ratio of solvent to nonsolvent components of about 2 to 1 is preferred to provide suitable viscosity during the coating stage.

In a preferred embodiment of the invention, the coating 30 is applied to the base paper 20 using a mixture of solvents. The solvent mixture includes one or more solvents having relatively high volatility (evaporation rate), combined with one or more nonvolatile solvents. The evaporation rate depends on a number of properties of the solvent or solvent mixture, as well as the drying parameters including temperature levels, temperature differential between the coating and the environment, and velocity of air flow past the coating. A principal governing factor is the vapor pressure characteristic of the solvent at the temperatures of interest; liquids of higher vapor pressure will have higher evaporation rates as a rule. Important secondary factors include latent heat and molecular weight of the solvent. Additionally, one must take into account the solvent retention properties of the nonvolatile components of a coating. Standard testing conditions are available for the measurement of evaporation rates, such as those of the Federation of Societies for Coating Technology, Philadelphia, PA.

Most preferably in using such solvent mixture the relatively volatile solvents are characterized by good solvency properties for the resin formulation of coating 30 (true solvents), while the relatively nonvolatile solvents act more as a diluent in the coating. During the drying stage, applicant has observed that the rapid evaporation of the volatile solvents produces a viscous intermediate stage resulting in a rough surface appearance. This effect is preserved during the slower evaporation of the remaining solvents.

In the preferred version of this embodiment, in which the relatively nonvolatile solvents are "diluents", the surface effect may be enhanced by a precipitation of the nonsolvent components when the solvent balance reaches the tolerance ratio of true solvents to diluents. This precipitation has been observed to create surface discontinuities in the dried resin layer 30. After vacuum deposition of the metallic layer 40, these surface discontinuities will lead to a markedly lower glossiness of the metallized paper, leading to a white appearance.

The gloss and whiteness resulting from the above technique may be controlled by altering the mixture of solvents and diluents, either in choice of materials or in their proportions. Too low a proportion of diluent will result in little or no reduction of glossiness. Increasing the diluent beyond a certain level will result in insufficient solubility of the resin in the initial solvent mixture. An illustrative solvent mixture is 15 percent Isopar H (Isopar is a trademark of Humble Oil & Refining Co., Houston, Tex., for a group of high purity isoparaffinic hydrocarbons); 65 percent toluene; 20 percent ethyl acetate. The proportions may be varied from about 10 percent Isopar H to about 25 percent Isopar H. Table 1 gives a partial list of suitable diluents, with standard evaporation rates and vapor pressures at 100° F. In general for the nonvolatile solvent, a vapor pressure in the range 0.05 to 1 PSI at 100° F. is preferred, most preferably between 0.05 and 0.5 PSI.

After addition of the solvent mixture to the nonsolvent components of intermediate layer 30, the resulting composition is coated onto paper base 20 using any suitable technique known in the art. Particular techniques include coated wire, reverse roll coating techniques (especially three roll reverse), and gravure printing techniques. The coating is laid down in a quantity advantageously in the range from 1 to 5 pounds per 3,000 square feet, most preferably between 2 and 3 lbs./3,000 sq. ft. The coated substrate is then passed through a drier in order to remove the solvent. Although conventional drying techniques generally involve either constant or gradually increasing temperatures in successive drying zones, applicant has developed an alternative, advantageous drying profile as discussed below.

TABLE I

| Solvent | Vapor Pressure (P.S.I.) @100° F. | Evaporation Rate (Seconds) 50% | Evaporation Rate (Seconds) 100% |
|---|---|---|---|
| V.M. & P. Naphtha EC[1] | 0.96 | 170[3] | 366[3] |
| Super V.M. & P. Naphtha[1] | 0.52 | 182[3] | 392[3] |
| Isopar G[2] | 0.4 | 900[4] | 2200[4] |
| Isopar H[2] | 0.4 | 2000[4] | 5100[4] |
| Isopar K[2] | 0.3 | 2100[4] | 5600[4] |
| Mineral Spirits 150-EC[1] | 0.16 | 1790[3] | 6350[3] |
| Mineral Spirits 135 (WR)[1] | 0.08 | 2150[3] | 7150[3] |
| Mineral Spirits 135 (H)[1] | 0.08 | 1960[3] | 7000[3] |

[1]Shell Chemical Co., East Orange, NJ
[2]Exxon Chemical Co., Houston, Texas
[3]Measured with Shell Evapo-Rater ®
[4]Measuring according to Method II of the Federation of Societies for Coating Technology, Philadelphia, PA.

Any conventional drying apparatus may be utilized to remove most or all of the solvents of layer 30, but the preferred apparatus is a drier of the convective air type. Conventional techniques for drying the coating on electrosensitive paper involve exposing the coated substrate to successively higher temperature stages, typically three stages. For example, the substrate may be exposed to successive stages of 200° F., 250° F., and 350° F. During exposure to high temperatures, the substrate is subjected to low velocity air flow to provide homogeneous evaporation of the solvents.

In a particular embodiment of the invention, this order of drying stages is modified so that the substrate is initially exposed to a high order temperature, then to the lowest, and finally to an intermediate temperature or temperatures. During the first stage, the coated substrate is subjected to a high velocity air flow at the elevated temperature, which has the effect of removing solvent at a very high evaporation rate. This results in surface discontinuities which are "frozen" in the second, low temperature stage, thereby rendering a rough surface appearance. An elevated temperature around 350° F. may be employed in the first zone to provide a pronounced effect. The first high temperature stage preferably has a dwell time of between 0.5 and 4 seconds, most preferably around 1.5 seconds.

As in the solvent mixture embodiment, the metallized surface will have a reduced glossiness which may approach the appearance of bond paper. This drying technique may be utilized with a conventional solvent mixture, or optionally in conjunction with the solvent-diluent mixture of the invention.

The resin coated paper is then passed through apparatus to provide a metallized surface, such as conventional high vacuum metallizing apparatus. A number of materials are suitable for metallic layer 40, but the preferred metal for most applications is aluminum, which is reasonable in cost and is easily vapor-deposited. The vapor-deposited layer should have a surface resistivity in the range from about 1 to 8 ohms per square, advantageously in the range from about 1.5 to 3.5 ohms per square. A thickness of about 25 to 30 millimicrons has proven suitable for this purpose. This surface resistivity range provides a compromise between a thick metallic layer which requires high current during printing, and a thin layer which inefficiently masks the black coating 30 and which may provide an inadequate current path for printing.

Figure 2:
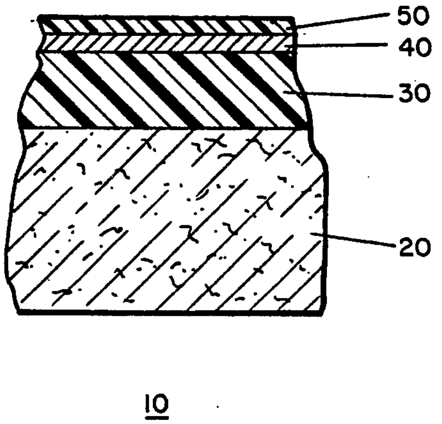
FIG. 2 is a sectional schematic view of electrosensitive paper in accordance with an alternative embodiment of the invention.

In an alternative embodiment of the invention, an additional layer 50 is added to electrosensitive paper 10, as illustrated in a sectional view of FIG. 2. Layer 50 contains a white pigment which is chosen for good opacity in very thin layers (on the order of several microns). Suitable materials include titanium dioxide, titanium calcium, titanium barium pigments, and zinc oxide. Layer 50 additionally includes a resin binder having a low resistivity, to minimize interference with the current flow during imprinting through metallic layer 40. This coating may be applied and dried using any of the conventional apparatus mentioned above.

In the examples which follow, the Gloss indices for the finished products were measured using the Standard Test Method for Specular Gloss, Standard D523 of the American Society for Testing and Materials (ASTM). These tests were performed on the metallized side of the paper using a Hunter Glossmeter D16 of Hunterlab, Fairfax, Va., at glossmeter geometrics of 75°.

The Whiteness Indices were measured using the Standard Test Method for Whiteness and Yellowness of Near-White, Opaque Materials, ASTM Standard E313-73. These tests were performed on the metallized side of the paper using a Hunter Color/Difference meter connected to a Hunterlab optical head model D25P. The Whiteness Index was defined in accordance with ASTM E313-73 as the reflectance difference, 3.388Z-Ey. The preferred whiteness range in accordance with the invention according to this standard is 83 or greater; most preferably, 86 or greater.

All parts and percentages are by weight unless otherwise specified.

EXAMPLE 1

Butyl Acrylate-butylethylacrylate copolymer (B66 resin of Rohm & Haas, Philadelphia, Pa.): 300 parts
Silica (average particle diameter 3 microns): 10 parts
Carbon Black 150 parts Ingredients in accordance with the above prior art formulation were dispersed in a ball mill. The resulting mixture was dissolved in a solvent formulation consisting of 200 parts ethyl acetate, and 600 parts toluene.

This solution was coated using a three roll reverse apparatus onto 40 pounds point Consolidated Print Opaque paper, manufactured by Consolidated Paper Incorporated, Wisconsin Rapids, Wis. in a quantity of three pounds per 3,000 square feet of paper. The coated paper was dried using a conventional convection technique with successive stages of 200° F., 250° F., and 300° F. A layer of aluminum was then vapor-deposited on the coated paper to a thickness of 25 millimicrons in a high vacuum metallizer.

The metallized paper had a shiny, metallic appearance with a gloss in the range 22.6–23.4, and a Whiteness Index in the range 77.6–82.2.

EXAMPLE 2

Ethyl Cellulose: 350 parts
Silica (average particle diameter 3 microns): 10 parts
Carbon Black: 150 parts Electrosensitive paper was fabricated using the technique of Example 1 with the following modifications.

The above ingredients were utilized as the coating formulation. The solvent mixture employed was 150 parts Isopar H, 200 parts ethyl acetate, and 650 parts toluene.

The metallized paper had a matte appearance with a Gloss in the range 16.8–18.8, and a Whiteness Index in the range 86.8–87.2.

EXAMPLE 3

Electrosensitive paper was fabricated according to Example 2, with the following modifications. The resin formulation was dissolved in a mixture of 300 parts ethyl acetate and 700 parts toluene. The coated paper was dried in a convection drier using an initial temperature stage of 350° F., subjecting the substrate to a high velocity air stream. The substrate was exposed to a second stage of 200° F., and a third stage of 300° F. Each stage involved a dwell time of 1.9 seconds.

The finished paper had a matte appearance, with a gloss of 12.0, and a Whiteness Index in the range 86.0–86.6.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

I claim:

1. An improved method of fabricating electrosensitive laminates of the type including the steps of providing a substrate, coating the substrate with a solvent-based resin formulation, drying the coated substrate to evaporate the solvent and vapor-depositing a metallic surface layer over the coated substrate, wherein the improved method employs as said solvent-based resin formulation a film-forming resin, a coloring material, a relatively volatile solvent, and a relatively nonvolatile solvent, wherein said drying causes a diluent blush effect, which after vapor-depositing the metallic surface layer results in a whiteness of at least 83 measured according to Standard E313-73 of the American Society for Testing and Materials.

2. A method according to claim 1 wherein the relatively volatile solvent comprises a true solvent for the film-forming resin and coloring material and wherein the relatively nonvolatile solvent comprises a diluent for the film-forming resin and coloring material.

3. A method according to claim 2 wherein the diluent is comprised of a material selected from the class consisting of solvent naptha and solvent naptha fractions.

4. A method according to claim 2 wherein the diluent is chosen from the class consisting of V.M. & P. naphtha, isoparaffinic hydrocarbons, and mineral spirits.

5. A method according to claim 1 wherein the relatively nonvolatile solvent has a vapor pressure in the range 0.05–1 PSI at 100° F.

6. A method according to claim 5 wherein the relatively nonvolatile solvent has a vapor pressure in the range 0.05–0.5 PSI at 100° F.

7. A method according to claim 1 wherein the relatively volatile solvent has a vapor pressure in the range 1–4 PSI at 100° F.

8. A method according to claim 1 wherein the substrate comprises paper; the resin formulation includes a nonconductive resin, a pigment, and a matting additive; and the metallic surface layer comprises aluminum having a surface resistivity in the range 1.–8 ohms per square.

9. A method according to claim 1 wherein the drying step comprises exposing the coated substrate to a high velocity air stream at a high order temperature, then exposing the coated substrate to a moderate air stream at a low order temperature, and finally exposing the coated substrate to a moderate air stream at an intermediate temperature.

10. A method according to claim 1 wherein the metallic surface layer has a whiteness of at least 86 according to Standard E313-73 of the American Society for Testing and Materials.

* * * * *